(12) United States Patent
Hiemeyer et al.

(10) Patent No.: US 10,640,278 B2
(45) Date of Patent: May 5, 2020

(54) VACUUM INSULATION BODY

(71) Applicants: LIEBHERR-HAUSGERATE LIENZ GMBH, Lienz (AT); LIEBHERR-HAUSGERATE OCHSENHAUSEN GMBH, Ochsenhausen (DE)

(72) Inventors: Jochen Hiemeyer, Karlstadt (DE); Michael Freitag, Wurzburg (DE); Martin Kerstner, Wurzburg (DE); Richard Stocker, Lienz (AT)

(73) Assignees: LIEBHERR-HAUSGERATE LIENZ GMBH, Lienz (AT); LIEBHERR-HAUSGERATE OCHSENHAUSEN GMBH, Ochsenhausen (DE)

( * ) Notice: Subject to any disclaimer, the term of this patent is extended or adjusted under 35 U.S.C. 154(b) by 65 days.

(21) Appl. No.: 15/528,768

(22) PCT Filed: Oct. 23, 2015

(86) PCT No.: PCT/EP2015/002107
§ 371 (c)(1),
(2) Date: May 23, 2017

(87) PCT Pub. No.: WO2016/082905
PCT Pub. Date: Jun. 2, 2016

(65) Prior Publication Data
US 2017/0327297 A1    Nov. 16, 2017

(30) Foreign Application Priority Data

Nov. 25, 2014  (DE) .......... 10 2014 017 424
Dec. 12, 2014  (DE) .......... 10 2014 018 549
Jun. 24, 2015  (DE) .......... 10 2015 008 123

(51) Int. Cl.
*B65D 81/38*  (2006.01)
*F16L 59/06*  (2006.01)
(Continued)

(52) U.S. Cl.
CPC ............. *B65D 81/38* (2013.01); *B65D 43/00* (2013.01); *F16L 59/06* (2013.01); *F25D 23/06* (2013.01); *F25D 2201/14* (2013.01)

(58) Field of Classification Search
CPC ........ B65D 81/38; F16L 59/06; F25D 23/065; E04B 1/803
See application file for complete search history.

(56) References Cited

U.S. PATENT DOCUMENTS 4,486,482 A   12/1984  Kobayashi et al.
4,668,551 A   5/1987   Kawasaki et al.
(Continued)

FOREIGN PATENT DOCUMENTS

DE    102013016774 A1    2/2015

OTHER PUBLICATIONS

International Search Report and Written Opinion issued in corresponding International Patent Application No. PCT/EP2015/002107 (with English translation of International Search Report) dated Feb. 23, 2016 (15 pages).
(Continued)

*Primary Examiner* — Andrew T Kirsch
(74) *Attorney, Agent, or Firm* — Kilyk & Bowersox, P.L.L.C.

(57) ABSTRACT

The present invention relates to a vacuum insulation body with at least one vacuum-tight casing and with at least one vacuum region which is surrounded by the casing, wherein the casing is provided with at least one opening, in particular with at least one evacuation port, for evacuating the vacuum region, and wherein in the vacuum insulation body at least
(Continued)

one adsorbent material is disposed, which partly or entirely is arranged in the region of said opening, wherein around the opening and within the vacuum range at least one plate is arranged, which forms a wall of the space in which the adsorbent material is disposed.

10 Claims, 2 Drawing Sheets

(51) Int. Cl.
    *F25D 23/06*     (2006.01)
    *B65D 43/00*     (2006.01)

(56) References Cited

U.S. PATENT DOCUMENTS

| | | |
|---|---|---|
| 4,726,974 A | 2/1988 | Nowobilski et al. |
| 5,252,408 A | 10/1993 | Bridges et al. |
| 5,376,424 A * | 12/1994 | Watanabe ............ B32B 1/06 428/69 |
| 5,500,305 A | 3/1996 | Bridges et al. |
| 5,532,034 A | 7/1996 | Kirby et al. |
| 5,625,742 A | 4/1997 | Boffito et al. |
| 5,826,780 A | 10/1998 | Nesser et al. |
| 6,264,092 B1 * | 7/2001 | Yasuda ............ B23K 1/001 228/161 |
| 2016/0178269 A1 | 6/2016 | Hiemeyer et al. |

OTHER PUBLICATIONS

Search Report issued in corresponding German Patent Application No. 10 2015 008 123.3 dated Sep. 17, 2015 (12 pages).

* cited by examiner

VACUUM INSULATION BODY

This application is a National Stage Application of PCT/EP2015/002107, filed Oct. 23, 2015, which claims priority to German Patent Application No. 10 2014 017 424.7, filed Nov. 25, 2014, German Patent Application No. 10 2014 018 549.4, filed Dec. 12, 2014, and German Patent Application No. 10 2015 008 123.3, filed Jun. 24, 2015, which are incorporated in their entireties by reference herein.

The present invention relates to a vacuum insulation body with at least one vacuum-tight casing and with at least one vacuum region which is surrounded by the casing, wherein the casing is provided with at least one opening, in particular with at least one evacuation port, for evacuating the vacuum region, and wherein in the vacuum insulation body at least one adsorbent material is disposed, which is partly or entirely arranged in the region of said opening.

It is known from the prior art to use vacuum insulation bodies for example for the heat insulation of refrigerators and/or freezers, which are disposed in the region between the outer shell of the appliance and the inner container or the inside of the door.

The following considerations by no means are limited to refrigerators and/or freezers, but apply for heat-insulated containers in general.

Such vacuum insulation bodies usually are constructed of a vacuum-tight casing which surrounds at least one vacuum region surrounded by the casing. In said vacuum region a supporting or core material is disposed, which provides the vacuum insulation body with the required mechanical stability and which also prevents that the sides of the casing rest against each other when a vacuum exists.

When gas penetrates into the vacuum region, this causes a rise of the gas pressure as well as a rise of the thermal conductivity and in this way reduces the effectiveness of the vacuum insulation body. In particular the permeation of water through the casing of the insulation body is decisive for a rise of the thermal conductivity of the vacuum insulation body due to the higher permeation rates as compared to oxygen and nitrogen.

To reduce or entirely exclude such negative influence, it is known to incorporate a material with a high adsorption capacity for water into the vacuum region, in order to keep the partial pressure in the vacuum region low even in the case of entering steam. As such material e.g. zeolite is taken into consideration. Materials which by chemisorption of oxygen and nitrogen keep their partial pressure low ("getters") also are taken into consideration and likewise serve to delay the ageing of the vacuum insulation body due to the input of gas and thus maintain the heat insulation properties as long as possible.

To generate vacuum in the vacuum region, the vacuum insulation body is provided with an evacuation port to which negative pressure is applied and through which the gas is withdrawn from the vacuum region. The entire gas or an essential part of the gas must be removed from the interior space of the vacuum insulation body or from the core material through the evacuation port. For this purpose, the adsorbent material can be arranged in the region of said opening of the vacuum insulation body or of its casing, whereby the generation of vacuum can become more efficient.

When the formation of vacuum is completed, the evacuation port, which for example is a film tube, is closed diffusion-tight, i.e. vacuum-tight, for example by thermal sealing.

It is the object underlying the present invention to develop a vacuum insulation body as mentioned above to the effect that the formation of vacuum can be carried out particularly safely and at low cost.

This object is solved by a vacuum insulation body with the features of claim 1. Accordingly, it is provided that around the opening and within the vacuum region at least one plate is arranged, which forms a wall of the space in which the adsorbent material is disposed.

Figure 1:
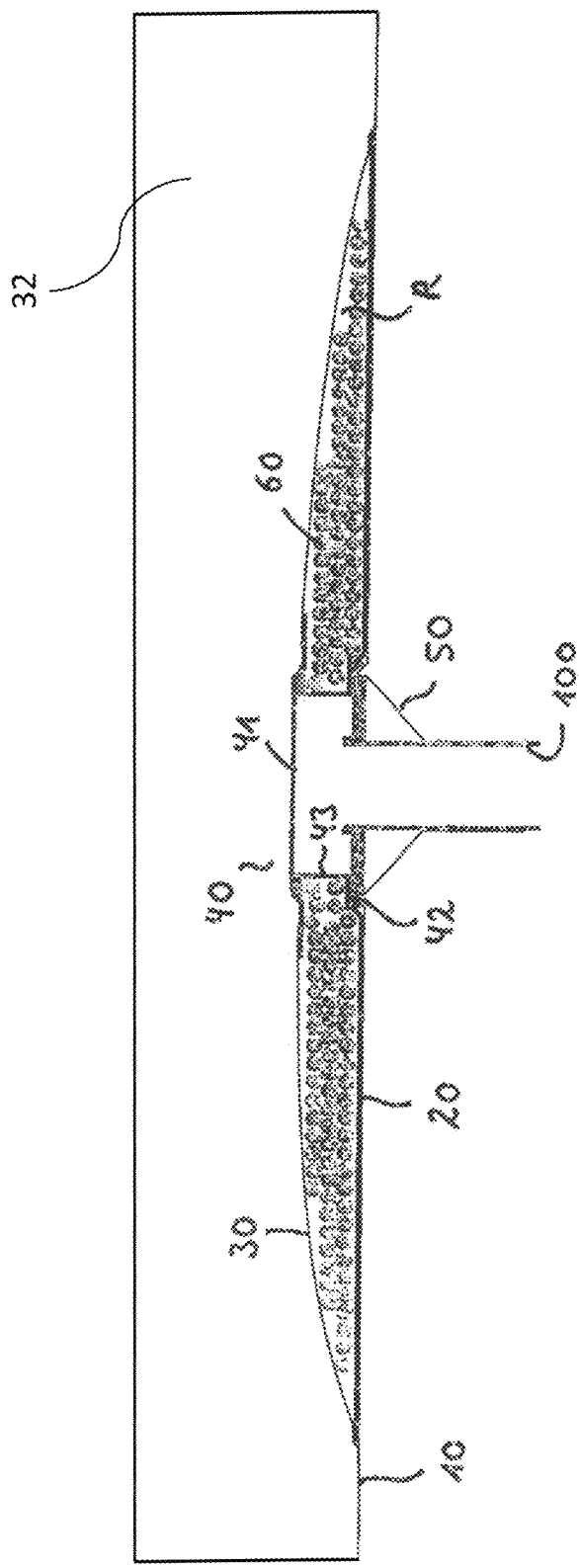
FIG. 1 shows a perspective sectional view of an exemplary construction of a vacuum insulation body according to the present invention.

The plate prevents that the casing or the enveloping film of the vacuum insulation body reproduces the contour of the adsorbent material, which for example can be present as beads or packing, wherein the film possibly would even be damaged. The plate thus constitutes a protection of the enveloping film against being damaged by the adsorbent material, which without the plate possibly is pressed into the film or casing. Such pressing in or reproduction of the contour not only can lead to the casing being damaged, but also to the fact that flow channels between the beads etc. are blocked. On the other hand, flow channels do exist between the adsorbent material and the plate, as the plate is formed such that even when a vacuum is formed the adsorbent material is not or at best insignificantly pressed into the plate.

Another advantage of the plate is a good coupling possibility for a heating device, such as for example a heating plate for heating during the evacuation process.

According to the invention, the plate is disposed within the vacuum region and on at least one side, preferably on the side of the casing, defines the space in which the adsorbent material is disposed.

The present invention furthermore relates to a vacuum insulation body with the features of claim 2.

Accordingly, it is provided that between the adsorbent material and the opening at least one molded part is arranged, which includes one or more molded part openings whose flow cross-section is larger than the flow cross-section of the opening of the casing. Such flow distributor improves the flow transition or reduces the flow resistance between the adsorbent material and the evacuation port, as the free flow cross-section is increased. This is achieved in that the flow cross-section of the molded part is larger than the diameter of the opening of the casing, so that a larger surface is available for through-flow. It thus is possible that even at a low pressure range a laminar flow is present.

The molded part serves as primary flow distributor or as means for promoting the flow. It can be designed as injection molded part.

In addition to this function the molded part also can form a receptacle for the clamping device of the film tube weld of the evacuation port and/or for the tube of the evacuation device.

In a preferred aspect of the invention it is provided that the two aspects of the invention according to claims 1 and 2 are combined, i.e. that both said base plate or plate and said molded part are provided.

It preferably is provided that the adsorbent material is present in the form of a plurality of individual bodies, preferably in the form of a plurality of individual beads or other spherical bodies and particularly preferably in the form of a packing.

In another aspect of the invention it is provided that at least one filter material, in particular at least one flowable material is arranged, which extends between the core material, such as e.g. pearlite, of the vacuum insulation body and the adsorbent material.

Thus, this filter material quasi forms the barrier or boundary between the core material of the vacuum insulation body and the adsorbent material which is disposed in the region of the opening of the casing.

The filter material can be a fleece, for example.

The filter material can be thermally sealed with said plate and/or with said molded part for flow improvement and/or with the casing itself.

In another aspect of the invention it is provided that the vacuum-tight casing consists of a high-barrier film. Alternatively or in addition it can be provided that the same is equipped with a sealable layer on both sides.

Furthermore, it can be provided that the vacuum-tight casing extends around the opening of the casing. It preferably adjoins the plate on the outside, so that the plate is arranged in the vacuum region.

It furthermore is conceivable that said plate and said molded body consist of different parts, which are e.g. latched or thermally sealed with each other or also otherwise connected with each other. However, the invention also comprises the case that the plate and the molded body consist of one and the same part or altogether are made in one piece.

In another aspect of the invention it is provided that the adsorbent material is arranged directly adjacent to the opening of the casing and/or directly adjacent to the molded part, and it also is conceivable that the adsorbent material is arranged such that it surrounds said opening and/or the molded part.

The adsorbent material can be arranged in a region which is adjacent to the opening and/or to the molded part. It preferably is arranged such that the gas passing through the opening during the generation of vacuum partly or entirely passes through the adsorbent material.

In another aspect of the invention it is provided that the adsorbent material is formed such that the same adsorbs water and/or nitrogen and/or oxygen. It is conceivable that the adsorbent material is at least one getter and/or zeolite. In addition or as an alternative to zeolite another or further drying agent also can be used. Thus, the term zeolite also is used as a placeholder for any other or further desiccant.

Figure 2:
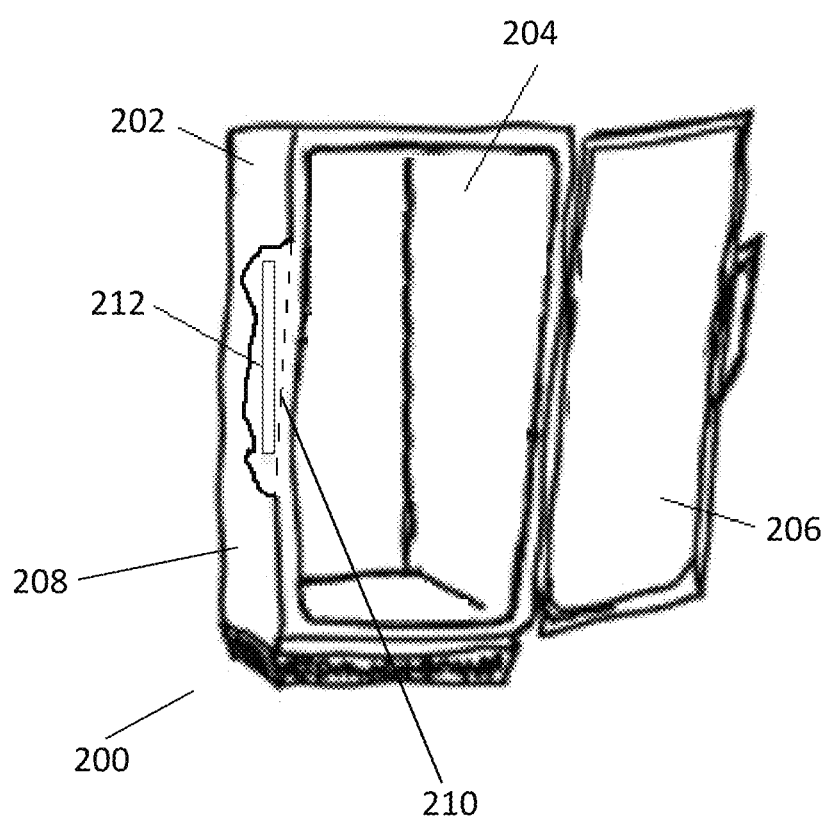
FIG. 2 shows a perspective view of the vacuum insulation body located in a heat-insulated container.

The present invention (see FIG. 2) furthermore relates to a heat-insulated container 200, preferably to a refrigerator and/or freezer with at least one body 202 and at least one tempered and preferably cooled interior space 204 which is surrounded by the body 202, and with at least one closure element 206 by means of which the tempered and preferably cooled interior space can be closed, wherein between the tempered and preferably cooled interior space and the outer wall 208 of the container and preferably appliance at least one interspace (210) is disposed, in which at least one vacuum insulation body (212) according to the invention is disposed.

The vacuum insulation body thus can be arranged between the outer shell and the inner container of the body or also between the outside and the inside of the door or another closure element.

What is particularly preferred is an embodiment in which between the inner wall defining the interior space and the outer skin a heat insulation is arranged, which consists of a full vacuum system. This is understood to be a heat insulation which exclusively or chiefly consists of an evacuated region which is filled with a core material. The boundary of this region for example can be formed by a vacuum-tight film and preferably by a high-barrier film. Thus, between the inner wall of the container, preferably the appliance, and the outer skin of the container, preferably the appliance, such film body exclusively can be present as heat insulation, which includes a region surrounded by a vacuum-tight film, in which a vacuum exists and in which a core material is arranged. A foam fill and/or vacuum insulation panels as heat insulation or another heat insulation apart from the full vacuum system between the inside and the outside of the container or appliance preferably are not provided.

This preferred kind of heat insulation in the form of a full vacuum system can extend between the wall defining the interior space and the outer skin of the body and/or between the inside and the outside of the closure element, such as a door, flap, lid or the like.

The full vacuum system can be obtained such that a casing of a gas-tight film is filled with a core material and subsequently sealed vacuum-tight. In one embodiment, both filling and vacuum-tight sealing of the casing is effected at normal or ambient pressure. The evacuation then is effected by connection of a suitable interface incorporated into the casing, for example of an evacuation port which can include a valve, to a vacuum pump. During the evacuation, normal or ambient pressure preferably exists outside the casing. In this embodiment, it preferably is not required at any time of the manufacture to incorporate the casing into a vacuum chamber. In so far, a vacuum chamber can be omitted in one embodiment during the manufacture of the vacuum insulation.

As explained above, the adsorbent material preferably consists of zeolite beads and/or of beads of another desiccating material. The same are separated from the core material (e.g. pearlite) of the vacuum insulation body preferably by a filter fleece. The latter preferably is welded onto said plate and onto the flow distributor, i.e. the molded part. The plate and the flow distributor or the molded part can be connected with each other by a latching connection or also in some other way.

It is preferred that the filter material on all sides protrudes to the outside beyond the plate, which also is referred to as base plate, as the complete component including a piece of the high-barrier film thereby can easily be connected with the sealing layer of the (further) high-barrier film of the vacuum insulation body.

In another aspect of the invention the entire component (molded part, base plate and fleece) is fixed on a piece of high-barrier film which on both sides is equipped with sealable layers, as the complete group thereby can by integrated in one process by a simple sealing connection.

Thus, an assembly comprising the molded part, the base plate, the fleece and possibly the adsorbent material as well as a piece of a high-barrier film preferably is formed, wherein it preferably is provided that the high-barrier film of the assembly has the largest extension, i.e. forms the edge regions of the assembly.

This assembly can be prepared as such and then be connected with the high-barrier film of the vacuum-tight casing, wherein for this purpose the high-barrier film of the assembly is inserted into an opening of the high-barrier film of the vacuum-tight casing and is vacuum-tightly connected with the high-barrier film of the vacuum-tight casing and preferably sealed.

Apart from a latching connection between the plate-shaped material or the plate and the molded part, their thermal sealing with each other for example can also be taken into consideration.

A vacuum-tight or diffusion-tight casing or a vacuum-tight or diffusion-tight connection or a high-barrier film preferably is understood to be a casing or a connection or a film by means of which the input of gas into the vacuum insulation body is reduced so much that the rise in the thermal conductivity of the vacuum insulation body due to the input of gas is low enough during its service life. Service life for example is understood to be a period of 15 years, preferably of 20 years, and particularly preferably of 30 years. Preferably, the rise in the thermal conductivity of the vacuum insulation body due to the input of gas during its service life is <100% and particularly preferably <50%.

Preferably, the area-specific gas permeation rate of the casing or the connection or the high-barrier film is $<10^{-5}$ mbar*l/s*m$^2$ and particularly preferably $<10^{-6}$ mbar*l/s*m$^2$ (as measured according to ASTM D-3985). This gas permeation rate applies for nitrogen and oxygen. For other types of gas (in particular steam) low gas permeation rates, preferably in the range of $<10^{-2}$ mbar*l/s*m$^2$ and particularly preferably in the range of $<10^{-3}$ mbar*l/s*m$^2$ (as measured according to ASTM F-1249-90) likewise do exist. Preferably, the aforementioned small rises in thermal conductivity are achieved by these low gas permeation rates.

An envelope system known from the field of vacuum panels are so-called high-barrier films. In accordance with the present invention, the same preferably are understood to be single- or multi-layer films (which preferably are sealable) with one or more barrier layers (typically metallic layers or oxide layers, wherein aluminum or an aluminum oxide preferably is used as metal or oxide), which satisfy the above-mentioned requirements (rise in thermal conductivity and/or area-specific gas permeation rate) as barrier against the input of gas.

The above-mentioned values or the structure of the high-barrier film are exemplary, preferred indications which do not limit the invention.

The tempered interior space either is cooled or heated depending on the type of appliance (refrigerator, heating cabinet, etc.). Heat-insulated containers in the sense of the present invention include at least one tempered interior space, wherein the same can be cooled or heated, so that in the interior space a temperature below or above the ambient temperature of e.g. 21° C. is obtained. The invention hence is not limited to refrigerators and/or freezers, but generally relates to appliances with a tempered interior space, for example also heating cabinets or heating chests.

In one embodiment it is provided that the container according to the invention is a refrigerator and/or freezer, in particular a household appliance or a commercial cooling device. For example, this comprises those appliances which are designed for a stationary arrangement in a household, in a hotel room, in a commercial kitchen or in a bar. For example, this can also be a wine refrigerator. Furthermore, chest refrigerators and/or freezers also are comprised by the invention. The appliances according to the invention can include an interface for connection to a power supply, in particular to a domestic mains supply (e.g. to a plug) and/or a standing or installation aid, such as for example adjustable feet, or an interface for fixation within a cabinet niche. For example, the appliance can be a built-in appliance or also a floor-mounted appliance.

Preferably the container or the appliance is formed such that it can be operated with an AC voltage, such as with a domestic voltage of e.g. 120 V and 60 Hz or 230 V and 50 Hz. In an alternative embodiment it is conceivable that the container or the appliance is formed such that it can be operated with direct current of a voltage of e.g. 5 V, 12 V or 24 V. In this aspect it can be provided that inside or outside the appliance a plug-in power supply unit is provided, via which the appliance is operated. An operation with DC voltage in particular can be employed when the container includes a thermoelectric heat pump for tempering the interior space.

In particular, it can be provided that the refrigerator and/or freezer has a cabinet-like design and includes a usable space which on its front side (in the case of a chest on the upper side) is accessible for a user. The usable space can be divided into several compartments, which all are operated at the same temperature or at different temperatures. Alternatively, merely one compartment can be provided. Within the usable space or a compartment storage aids such as for example storage compartments, drawers or bottle holders (in the case of a chest also space dividers) can be provided, in order to ensure an optimum storage of refrigerated or frozen goods and an optimum use of space.

The usable space can be closed by at least one door pivotable about a vertical axis. In the case of a chest a flap pivotable about a horizontal axis or a sliding cover is conceivable as closure element. In the closed condition, the door or another closure element can substantially air-tightly be connected with the body by means of a circumferential magnetic seal. Preferably, the door or another closure element also is heat-insulated, wherein the heat insulation can be achieved by means of a foam fill and possibly by means of vacuum insulation panels, or also preferably by means of a vacuum system and particularly preferably by means of a full vacuum system. On the inside of the door, door shelves possibly can be provided, so that refrigerated goods also can be stored there.

In one embodiment, this can be a small appliance. In such appliances the usable space, which is defined by the inner wall of the container, for example has a volume of less than 0.5 m$^3$, less than 0.4 m$^3$ or less than 0.3 m$^3$. The outside dimensions of the container or appliance preferably lie in the range of up to 1 m in terms of height, width and depth.

Further details and advantages of the invention will be explained in detail with reference to an exemplary embodiment illustrated in the drawing.

FIG. 1 shows a perspective sectional view of an exemplary construction of a vacuum insulation body according to the invention in the region of the evacuation port. The vacuum insulation body comprises a high-barrier film 10 that encloses a vacuum region which according to the FIG. 1 extends above the illustrated segment of the high-barrier film 10.

The arrangement according to FIG. 1 also can be provided as such, i.e. as assembly (with or without desiccant or getter 60), and then be vacuum-tightly connected with the further high-barrier film of the vacuum insulation body during the manufacturing process.

Reference numeral 20 designates the plate or base plate that is fabricated of a material which is resistant to the introduction of zeolite beads when forming the vacuum, so that the beads cannot press into the material of the base plate 20.

Reference numeral 30 designates a filter fleece, in order to separate the core material 32 which is disposed above the filter fleece and above the high-barrier film from the sorption pump or from the space R. In the space R the adsorbent material 60 is disposed, which can be e.g. zeolite beads or a packing of zeolite beads.

Reference numeral 40 finally designates the molded part according to the invention, which serves as flow distributor or flow provider from the space to the evacuation port 50. The evacuation port 50 consists of a film tube and likewise is vacuum-tight. Preferably, the evacuation port 50 also consists of a high-barrier film. It suitably is vacuum-tightly connected with the high-barrier film 10.

As can furthermore be taken from FIG. 1, the flow distributor has an upper plate-shaped portion 41 to which the filter fleece 30 is attached. Furthermore, a lower portion 42 is shown, which is e.g. thermally sealed or otherwise connected with the plate 10. Between the regions 41 and 42 a circumferential region 43 extends, which for example can have the shape of a cylinder piece and which includes apertures through which the gas obtained during evacuation is withdrawn from the space R.

The plate-shaped portion 41 can be gas-impermeable or also porous or be provided with one or more openings, so that gas can penetrate through the portion 41.

By using the flow distributor 40, the free flow cross-section in this way can be increased during evacuation with respect to the cross-sectional area of the evacuation port 50 or of the evacuation tube 100 of the vacuum generation unit introduced into the same and thus increase the efficiency during evacuation.

It can furthermore be seen in FIG. 1 that the molded body not only has the task to provide for the evacuation of the space R, but in addition to also form a receptacle for the evacuation tube 100 which is enclosed by the evacuation port 50.

The region 41 of the flow distributor 40 preferably is gas-impermeable, so that during evacuation the gas gets through the fleece 30 into the space R and from the space R through the openings in the web-like regions 43 to the evacuation tube 100.

The plate 20 preferably is designed flat. On its inside it adjoins the space R for receiving the adsorbent material and on its outside the high-barrier film 10. The plate 20 provides the arrangement with a certain mechanical stability, provides for the tight abutment of a heating device from outside, i.e. according to FIG. 1 from below, and also prevents that flow channels are clogged in that the adsorbent material is pressed in during evacuation. Furthermore, the high-barrier film is protected against being damaged by penetrating adsorbent material.

The invention claimed is:

1. A vacuum insulation body with at least one vacuum-tight casing and with at least one vacuum region which is surrounded by the casing, wherein the casing is provided with at least one opening, whereby the at least one opening is an evacuation port, for evacuating the vacuum region, and wherein in the vacuum insulation body at least one adsorbent material is disposed, which partly or entirely is arranged in the region of said opening,
wherein between the adsorbent material and the opening at least one molded part is arranged, which includes one or more molded part openings whose flow cross-section is larger than the flow cross-section of the opening of the casing, wherein the vacuum-tight casing consists of a high-barrier film with two sides and is a multi-layer film of metallic layers or oxide layers with a sealable layer on each of the two sides.

2. The vacuum insulation body according to claim 1, wherein around the opening and within the vacuum region at least one plate is arranged, which forms a wall of the space in which the adsorbent material is disposed, wherein the plate adjoins on its inside the space for receiving the adsorbent material and on its outside the vacuum-tight casing.

3. The vacuum insulation body according to claim 2, characterized in that the plate and the molded part consist of different parts which are latched or thermally sealed with each other, or that the plate and the molded part consist of one common part.

4. The vacuum insulation body according to claim 3, characterized in that the adsorbent material is present in the form of a plurality of individual bodies.

5. The vacuum insulation body according to claim 1, characterized in that the adsorbent material is present in the form of a plurality of individual bodies.

6. The vacuum insulation body according to claim 1, characterized in that the vacuum-tight casing extends around the opening of the casing.

7. The vacuum insulation body according to claim 1, characterized in that the adsorbent material is arranged directly adjacent to the opening and/or directly adjacent to the molded part and/or is arranged such that it surrounds the opening and/or the molded part.

8. The vacuum insulation body according to claim 1, characterized in that the adsorbent material is arranged in a region which is adjacent to the opening.

9. The vacuum insulation body according to claim 1, characterized in that the adsorbent material is arranged such that the gas passing through the opening during generation of a vacuum partly or completely passes through the adsorbent material.

10. The vacuum insulation body according to claim 1, characterized in that the adsorbent material is formed such that it adsorbs water and/or nitrogen and/or oxygen and/or that the adsorbent material is at least one getter and/or drying agent.

* * * * *